US006350963B1

(12) United States Patent
Gray

(10) Patent No.: US 6,350,963 B1
(45) Date of Patent: Feb. 26, 2002

(54) HEATED TIRE

(76) Inventor: Kevin L. Gray, 535 E. Sanger St., Philadelphia, PA (US) 19120

( * ) Notice: Subject to any disclaimer, the term of this patent is extended or adjusted under 35 U.S.C. 154(b) by 0 days.

(21) Appl. No.: 09/887,241

(22) Filed: Jun. 22, 2001

(51) Int. Cl.[7] ................................................ B60L 1/02
(52) U.S. Cl. ........................ 219/202; 219/544; 219/549
(58) Field of Search ................................ 219/202, 544, 219/549

(56) References Cited

U.S. PATENT DOCUMENTS

| 3,922,415 A | * | 11/1975 | Dexter | 428/133 |
| 3,934,463 A | * | 1/1976 | Kalpin et al. | 152/210 |
| 4,197,895 A | * | 4/1980 | Reyes | 152/416 |
| 4,211,366 A | * | 7/1980 | Czarnota | 238/14 |
| 4,281,791 A | * | 8/1981 | Schaaf et al. | 238/14 |
| 4,284,451 A | * | 8/1981 | Conley | 156/97 |
| 5,573,686 A | * | 11/1996 | Lavicska | 219/202 |
| 5,897,802 A | * | 4/1999 | Jones | 219/202 |

* cited by examiner

*Primary Examiner*—Teresa Walberg
*Assistant Examiner*—Shawntina T. Fuqua

(57) ABSTRACT

A heated tire for melting snow and ice that contacts a vehicle's tire tread. The heated tire includes a vehicle tire that has a heating apparatus integrally formed within the tire between the tire tread and the outermost steel belt and is automatically activated by a control unit interlinked to a temperature sensor.

6 Claims, 1 Drawing Sheet

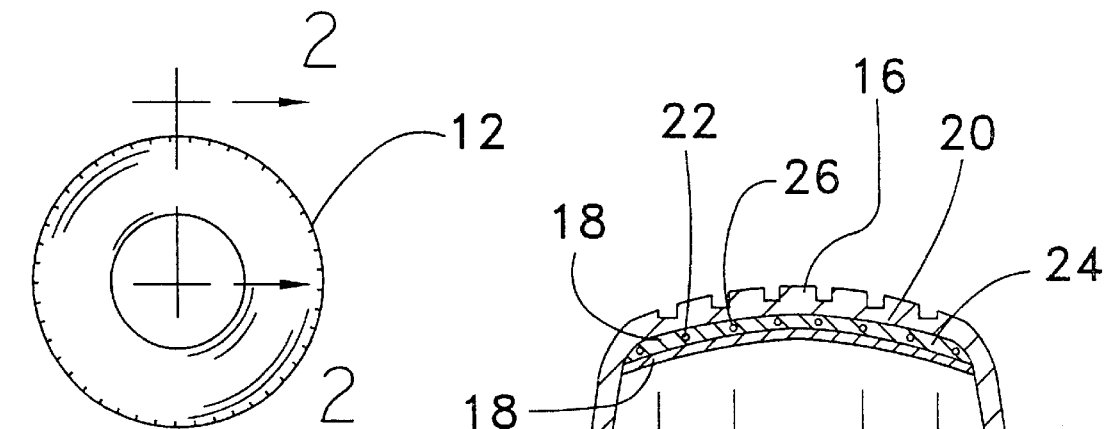
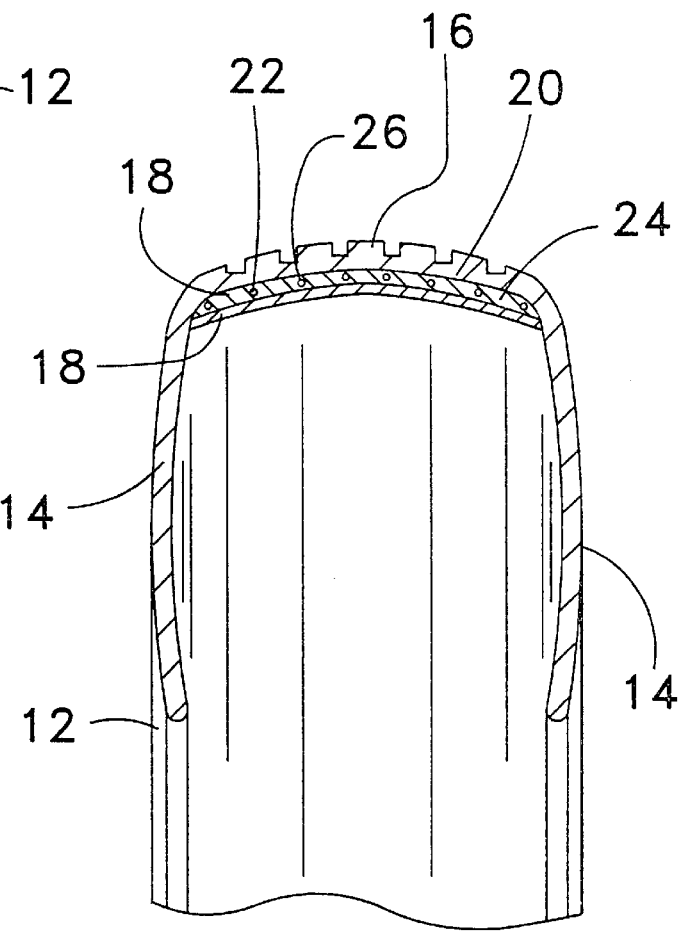
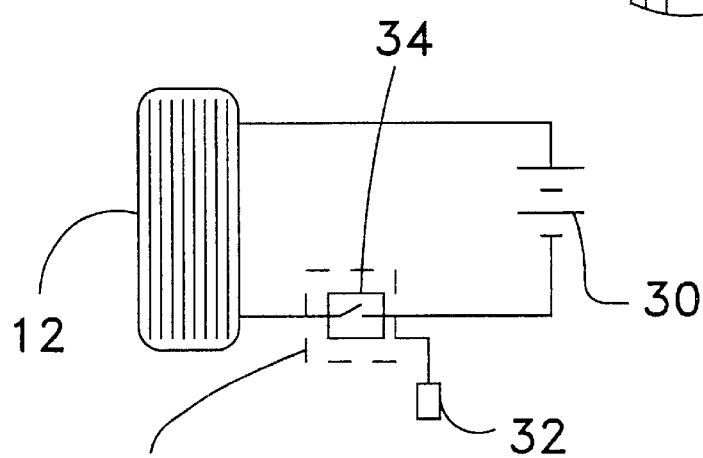
FIG. 1
FIG. 2
FIG. 3

HEATED TIRE

BACKGROUND OF THE INVENTION

1. Field of the Invention

The present invention relates to heated tires and more particularly pertains to a new heated tire for melting snow and ice that contacts a vehicle's tire tread.

2. Description of the Prior Art

The use of heated tires is known in the prior art. More specifically, heated tires heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,298,722; U.S. Pat. No. 5,573,686; U.S. Pat. No. 4,203,423; U.S. Pat. No. 3,289,668; U.S. Pat. No. 4,320,286; and U.S. Pat. No. 4,814,585.

While these devices fulfill their respective, particular objectives and requirements, the aforementioned patents do not disclose a new heated tire. The inventive device includes a vehicle tire that has a heating apparatus integrally formed within the tire between the tire tread and the outermost steel belt and is automatically activated by a control unit interlinked to a temperature sensor.

In these respects, the heated tire according to the present invention substantially departs from the conventional concepts and designs of the prior art, and in so doing provides an apparatus primarily developed for the purpose of melting snow and ice that contacts a vehicle's tire tread.

SUMMARY OF THE INVENTION

In view of the foregoing disadvantages inherent in the known types of heated tires now present in the prior art, the present invention provides a new heated tire construction wherein the same can be utilized for melting snow and ice that contacts a vehicle's tire tread.

The general purpose of the present invention, which will be described subsequently in greater detail, is to provide a new heated tire apparatus and method which has many of the advantages of the heated tires mentioned heretofore and many novel features that result in a new heated tire which is not anticipated, rendered obvious, suggested, or even implied by any of the prior art heated tires, either alone or in any combination thereof.

To attain this, the present invention generally comprises a vehicle tire that has a heating apparatus integrally formed within the tire between the tire tread and the outermost steel belt and is automatically activated by a control unit interlinked to a temperature sensor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new heated tire apparatus and method which has many of the advantages of the heated tires mentioned heretofore and many novel features that result in a new heated tire which is not anticipated, rendered obvious, suggested, or even implied by any of the prior art heated tires, either alone or in any combination thereof.

It is another object of the present invention to provide a new heated tire which may be easily and efficiently manufactured and marketed.

It is a further object of the present invention to provide a new heated tire which is of a durable and reliable construction.

An even further object of the present invention is to provide a new heated tire which is susceptible of a low cost of manufacture with regard to both materials and labor, and which accordingly is then susceptible of low prices of sale to the consuming public, thereby making such heated tire economically available to the buying public.

Still yet another object of the present invention is to provide a new heated tire which provides in the apparatuses and methods of the prior art some of the advantages thereof, while simultaneously overcoming some of the disadvantages normally associated therewith.

Still another object of the present invention is to provide a new heated tire for melting snow and ice that contacts a vehicle's tire tread.

Yet another object of the present invention is to provide a new heated tire which includes a vehicle tire that has a heating apparatus integrally formed within the tire between the tire tread and the outermost steel belt and is automatically activated by a control unit interlinked to a temperature sensor.

Still yet another object of the present invention is to provide a new heated tire that is automatically activated when the temperature is below freezing.

Even still another object of the present invention is to provide a new heated tire that assists in getting the vehicle out of snowy ruts by melting the icy surface the tire is stuck on.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic side view of a new heated tire according to the present invention.

FIG. 2 is a schematic cross-sectional view of the tire portion of the present invention.

FIG. 3 is a schematic view depicting the vehicle's tire and battery operationally coupled to the control unit and the temperature sensor.

DESCRIPTION OF THE PREFERRED EMBODIMENT

With reference now to the drawings, and in particular to FIGS. 1 through 3 thereof, a new heated tire embodying the principles and concepts of the present invention and generally designated by the reference numeral 10 will be described.

As best illustrated in FIGS. 1 through 3, the heated tire 10 generally comprises a vehicle tire 12 that has sidewalls 14 and a tread portion 16 for forming the vehicle tire 12.

The vehicle tire 12 has a plurality of steel belts 18 located adjacent to an inner surface 20 of the tread portion 16. The steel belts 18 are for adding strength to the vehicle tire 12.

The vehicle tire 12 has a heating apparatus 22. The heating apparatus 22 is located between an outer steel belt 24 and the tread portion 16 for heating the tread portion 16 to facilitate the melting of the accumulation of ice and snow on the vehicle tire 12.

The heating apparatus 22 comprises a plurality of heating wires 26. The heating wires 26 are equally spaced across a cross-section of the vehicle tire 12. The heating wires 26 extend the full circumference of the vehicle tire 12 for heating of the tread portion 16.

The heating wires 26 are operationally coupled to a control unit 28. The control unit 28 is located substantially within a vehicle and is designed for controlling the operation of the heating wires 26. The control unit 28 is operationally coupled to a vehicle's battery 30, such that when the control unit 28 activates the heating wires 26, the tread portion 16 of the vehicle tire 12 is thereby heated.

The control unit 28 is operationally coupled to a temperature sensor 32. The temperature sensor 32 is located in an exterior area of the vehicle such that the temperature sensor 32 accurately detects the ambient air temperature. The temperature sensor 32 is designed for detecting when the ambient air temperature is below freezing, thereby allowing the control unit 28 to automatically activate the heating wires 26.

The control unit 28 has a manual switch 34. The manual switch 34 is accessible to a user of the vehicle such that the manual switch 34 is designed for enabling or disabling the control unit 28 regardless of the ambient air temperature.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A heated tire for melting snow and ice that contacts a vehicle's tire tread, the heated tire comprising:

a vehicle tire, said vehicle tire having sidewalls and a tread portion for forming said vehicle tire;

said vehicle tire having a plurality of steel belts, said steel belts being located adjacent to an inner surface of said tread portion, said steel belts being for adding strength to said vehicle tire; and said vehicle tire having a heating apparatus, said heating apparatus being located between an outer steel belt and said tread portion for heating said tread portion to facilitate the melting of the accumulation of ice and snow on said vehicle tire.

2. The heated tire as set forth in claim 1, further comprising:

said heating apparatus comprising a plurality of heating wires, said heating wires being equally spaced across a cross section of said vehicle tire, said heating wires extending the full circumference of said vehicle tire for heating of said tread portion.

3. The heated tire as set forth in claim 2, further comprising:

said heating wires being operationally coupled to a control unit, said control unit being located substantially within a vehicle, said control unit being adapted for controlling the operation of said heating wires, said control unit being operationally coupled to a vehicle's battery such that when said control unit activates said heating wires, said tread portion of said vehicle tire is thereby heated.

4. The heated tire as set forth in claim 3, further comprising:

said control unit being operationally coupled to a temperature sensor, said temperature sensor being located in an exterior area of the vehicle such that said temperature sensor accurately detects the ambient air temperature; and said temperature sensor being adapted for detecting when the ambient air temperature is below freezing, thereby allowing said control unit to automatically activate said heating wires.

5. The heated tire as set forth in claim 4, further comprising:

said control unit having a manual switch, said manual switch being accessible to a user of the vehicle such that said manual switch being adapted for enabling or disabling said control unit regardless of the ambient air temperature.

6. A heated tire for melting snow and ice that contacts a vehicle's tire tread, the heated tire comprising:

a vehicle tire, said vehicle tire having sidewalls and a tread portion for forming said vehicle tire;

said vehicle tire having a plurality of steel belts, said steel belts being located adjacent to an inner surface of said tread portion, said steel belts being for adding strength to said vehicle tire;

said vehicle tire having a heating apparatus, said heating apparatus being located between an outer steel belt and said tread portion for heating said tread portion to facilitate the melting of the accumulation of ice and snow on said vehicle tire;

said heating apparatus comprising a plurality of heating wires, said heating wires being equally spaced across a cross section of said vehicle tire, said heating wires extending the full circumference of said vehicle tire for heating of said tread portion;

said heating wires being operationally coupled to a control unit, said control unit being located substantially within a vehicle, said control unit being adapted for controlling the operation of said heating wires, said control unit being operationally coupled to a vehicle's battery such that when said control unit activates said heating wires, said tread portion of said vehicle tire is thereby heated;

said control unit being operationally coupled to a temperature sensor, said temperature sensor being located in an exterior area of the vehicle such that said temperature sensor accurately detects the ambient air temperature;

said temperature sensor being adapted for detecting when the ambient air temperature is below freezing, thereby allowing said control unit to automatically activate said heating wires;

said control unit having a manual switch, said manual switch being accessible to a user of the vehicle such that said manual switch being adapted for enabling or disabling said control unit regardless of the ambient air temperature.

\* \* \* \* \*